United States Patent [19]
Delli-Gatti, Jr.

[11] Patent Number: 5,992,941
[45] Date of Patent: Nov. 30, 1999

[54] CONVEYOR FOR ULTRA THIN SEAM COAL MINING

[76] Inventor: Frank Delli-Gatti, Jr., P.O. Box 1085, Beckley, W. Va. 25801

[21] Appl. No.: 08/898,753

[22] Filed: Jul. 23, 1997

[51] Int. Cl.$^6$ .................................................. E21C 35/02
[52] U.S. Cl. ............................... 299/64; 299/56; 198/303
[58] Field of Search .................................. 299/1.4, 18, 56, 299/64, 67; 198/303, 311, 589

[56] References Cited

U.S. PATENT DOCUMENTS

| | | | |
|---|---|---|---|
| 2,826,402 | 3/1958 | Alspaugh et al. | 299/1.4 |
| 2,978,235 | 4/1961 | Felbeck et al. | 299/56 |
| 3,279,584 | 10/1966 | Towles | 198/311 X |
| 3,874,735 | 4/1975 | Delli-Gatti, Jr. | 299/68 |
| 4,013,167 | 3/1977 | Bourgeois | 198/860.2 |
| 4,031,997 | 6/1977 | Nelson | 198/301 |
| 4,120,535 | 10/1978 | Delli-Gatti, Jr. | 299/18 |
| 4,256,213 | 3/1981 | Shaw et al. | 198/303 |
| 4,288,125 | 9/1981 | Ingle | 299/30 |
| 5,112,111 | 5/1992 | Addington | 299/18 |
| 5,299,674 | 4/1994 | Cusitar | 198/303 |
| 5,366,059 | 11/1994 | Demong | 198/303 |
| 5,871,260 | 2/1999 | Delli-Gatti et al. | 299/19 |

FOREIGN PATENT DOCUMENTS

| | | |
|---|---|---|
| 50108/90 | 3/1991 | Australia . |
| WO 97/02200 | 1/1997 | WIPO . |

OTHER PUBLICATIONS

"Club Car® Golf's Driving Force" brochure, Club Car Inc. 1996.
"Hannay Reels" brochure, Clifford B. Hannay & Son, Inc., 1981.

*Primary Examiner*—David Bagnell
*Assistant Examiner*—Sunil Singh
*Attorney, Agent, or Firm*—Nixon & Vanderhye P.C.

[57] ABSTRACT

A conveyor cart for a mining machine is made from readily available components, including conventional golf cart components, and has a maximum height of 20 inches or less (e.g. about 18 inches) so that it can be effectively utilized with a continuous miner for mining ultra thin coal seams. A chassis has side rails with front and rear ends and cross pieces extending between the side rails. A first coupling mechanism, such as an eye bolt, is mounted adjacent the front end, and a second coupling mechanism, such as a pintle hook, mounted adjacent the rear end. A single axle containing a pair of inflatable golf cart wheels extends between the side rails and may be driven by a conventional golf cart transmission and an AC motor. An endless conveyor belt is mounted so that it has a top portion for conveying mined material from the continuous mining machine to the mine mouth, and a bottom portion beneath the top portion, the conveyor belt powered by an electric motor mounted to the chassis. The cart includes an electrical cord with female and male plugs at opposite ends, and can support a safety cable and an electrical cable that go from the mine mouth to the continuous miner.

24 Claims, 8 Drawing Sheets

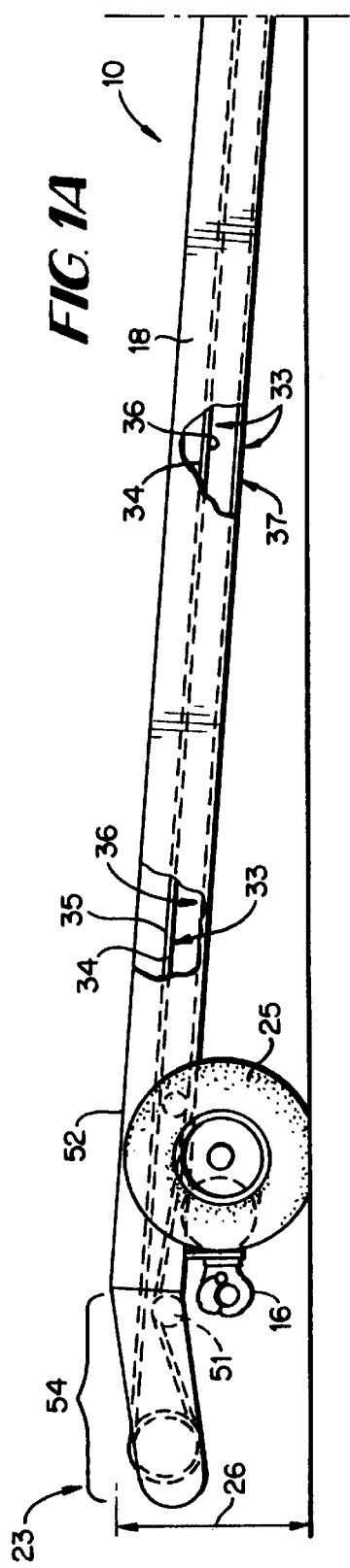
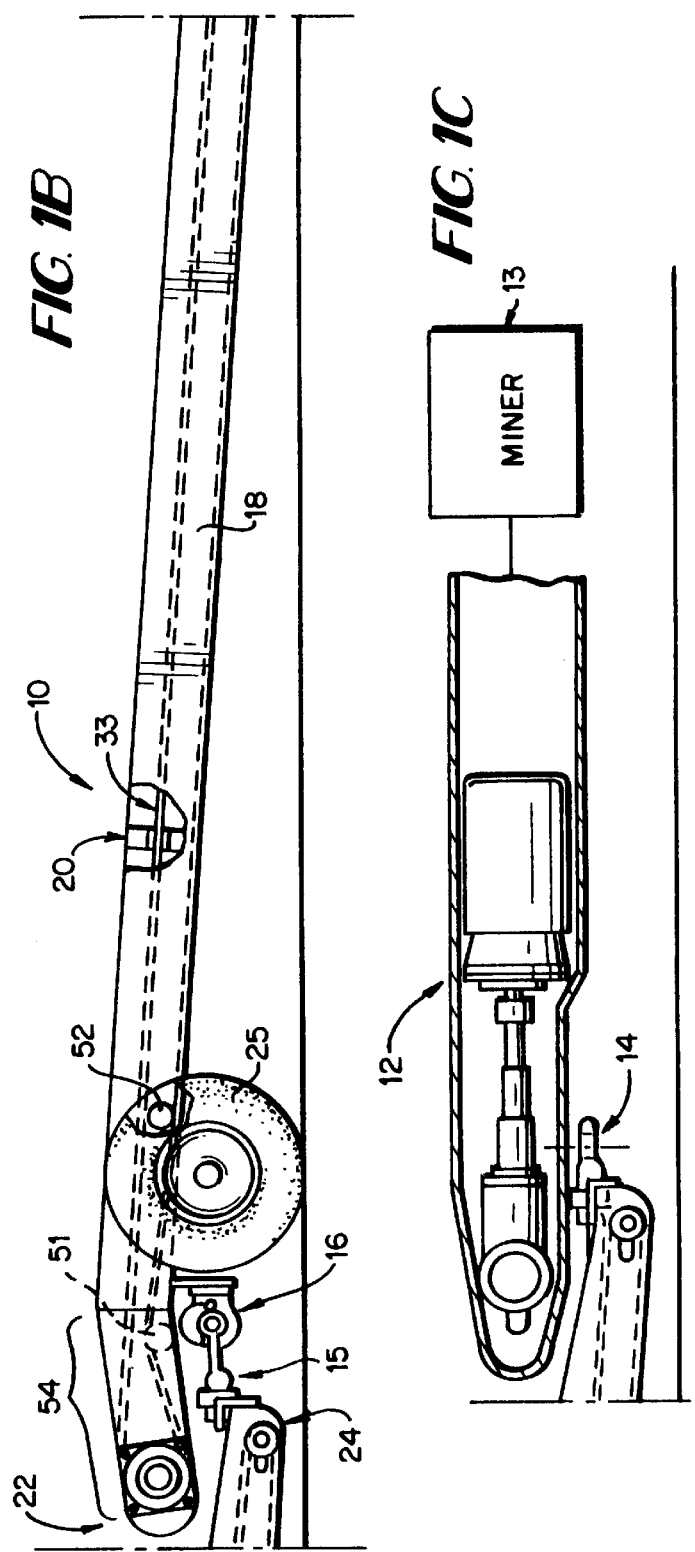

CONVEYOR FOR ULTRA THIN SEAM COAL MINING

BACKGROUND AND SUMMARY OF THE INVENTION

A continuous mining machine which is capable of mining ultra thin coal seams (having a thickness of around two feet or less) is described in U.S. Pat. No. 5,871,260 (the disclosure of which is hereby incorporated by reference herein). According to the present invention a conveyor cart is provided which may be advantageously used with the continuous miner of U.S. Pat. No. 5,871,260, and the invention also relates to a combination of the miner of U.S. Pat. No. 5,871,260 and a conveyor for effectively mining ultra thin coal seams and the like.

In order to effectively convey coal mined by the continuous miner of said co-pending application to the mine mouth the conveyor utilized with the miner should have a maximum height of about 20 inches or less. Also, in order to be cost effective, the conveyor should be constructed from as many off the shelf commercially available components as possible. Such a conveyor must also have high maneuverability and reliability, and must be easy to connect and disconnect from the mining machine, and from other conveyor components, so that a conveyance path of any desired length may be provided.

According to the present invention a conveyor cart is provided as the desired conveyor for use with the continuous miner of said co-pending application. The conveyor cart according to the invention is advantageously constructed from virtually all readily available, off the shelf, components, and is especially cost effective, and is made maneuverable, yet highly functional, by employing components typically used in conventional golf carts, such as the "Club Car"® golf carts available from Club Car Inc. of Augusta, Ga., an Ingersoll-Rand company.

According to one aspect of the present invention, a conveyor cart for a mining machine (such as in said co-pending application) is provided comprising the following components: A chassis comprising first and second side rails, and a plurality of cross pieces extending between the side rails, each side rail having a first end and a second end. A first coupling mechanism mounted adjacent the first ends of the side rails for coupling the cart to a like cart. An axle extending generally perpendicular to the side rails and closer to the second ends of said side rails than the first ends. First and second wheels mounted to the axle on opposite ends thereof. An endless conveyor belt. Means for mounting the conveyor belt to the chassis so that the conveyor belt has a top portion for conveying mined material thereon, and a bottom portion, and so the top portion moves from adjacent the first ends of the side rails toward the second ends of the side rails while the bottom portion moves oppositely. Means for moving the conveyor belt with respect to the chassis so the top portion moves from the first ends of the side rails toward the second ends of said side rails while the bottom portion moves oppositely. And, a second coupling mechanism mounted adjacent the second ends of the rails and beneath the bottom portion of the conveyor and closer to the second ends of the rails than the wheels, for coupling the cart to a like cart, so that when two like carts are coupled together the top surface of the leading cart is above the top portion of the trailing cart.

The means for mounting the conveyor belt preferably comprises a first roller adjacent the first end of the side rails and extending substantially perpendicular thereto; a second roller adjacent the second end of the side rails and extending substantially perpendicular thereto; and top surfaces of the cross pieces disposed between the top and bottom portions of the conveyor belt and engaging a bottom surface of the top portion of the conveyor belt. One of the rollers is driven by the means for moving the conveyor belt, which preferably comprises a conventional, off the shelf, air cooled electric motor, such as a five horsepower TEFC electric motor available from Dodge and known by the trade name Gearmotor No. WG-28A. The conveyor cart has a maximum height of 20 inches or less, preferably about 18 inches.

The conveyor cart further comprises means mounted on the chassis for powering the axle and thereby driving the wheels. The means for powering the axle preferably comprises an air cooled AC motor and a golf cart transmission, both mounted adjacent the axle. The wheels are preferably inflatable golf cart tires, and the axle preferably comprises a golf cart axle. The means for mounting the conveyor belt further comprises directing rollers for causing the bottom portion of the belt to pass over the axle, motor, and transmission in moving from the second roller to the first roller. Also the conveyor cart preferably comprises an electrical wire mounted to the chassis and electrically connected to the A C motor, and having a female plug and a male plug, the female plug adjacent the first ends of the side rails, and the male plug adjacent the second ends of the side rails. Also the axle and the wheels preferably comprise the only axle and wheels of the cart, making the cart highly maneuverable and inexpensive.

The cart may further comprise an electrical cable supporting trough mounted to at least one of the side rails for mounting an electrical cable therein (which electrical cable powers the continuous miner), and a clamping mechanism would be mounted on the chassis for clamping a safety cable to the chassis (the safety cable being connected to the continuous miner and reel at the mine mouth). While the first and second clamping mechanisms may comprise any of a wide variety of conventional ball joints, universal joints, pintle hooks, or the like, preferably the first coupling mechanism comprises an eye bolt while the second coupling mechanism comprises a pintle hook, the coupling mechanisms allowing pivotal movement, about a substantially vertical axis, of a trailing cart with respect to a leading cart when coupled together.

According to another aspect of the present invention a conveyor cart for a mining machine is provided comprising: A chassis comprising first and second side rails, and a plurality of cross pieces extending between the side rails, each side rail having a first end and a second end. An axle extending generally perpendicular to the side rails and closer to the second ends of the side rails than the first ends. First and second wheels mounted to the axle on opposite ends thereof. An endless conveyor belt. Means for mounting the conveyor belt to the chassis so that the conveyor belt has a top portion for conveying mined material thereon, and a bottom portion, and so the top portion moves from adjacent the first ends of the side rails toward the second ends of the side rails while the bottom portion moves oppositely. Means for moving the conveyor belt with respect to the chassis so the top portion moves from the first ends of the side rails toward the second ends of the side rails while the bottom portion moves oppositely. And, wherein the cart has a maximum height of twenty inches [0.5 meters] or less. The details of the components of the cart may be as described above.

According to another aspect of the present invention a continuous mining machine system is provided. The system includes the continuous mining machine, as in U.S. Pat. No. 5,871,260 and a plurality of wheeled conveyor carts. The mining machine comprises the following components: a chassis supported by crawler tracks, and having a front and a rear and elongated in a first dimension between the front and the rear; a substantially horizontal axis powered cutter head mounted to the front of the chassis; a conveyor mounted to the chassis and including an endless conveyor chain; the chain connected to first and second sprockets, the first sprocket mounted for rotation about a first shaft adjacent the rear of the chassis, and the second sprocket mounted for rotation about a second shaft adjacent the front of the chassis but between the first sprocket and the cutter head; the first and second shafts rotatable about axes generally perpendicular to the first dimension; at least one motor for driving one of the first and second shafts to thereby drive one of the sprockets and the conveyor; a gathering head mounted adjacent the front of the chassis and below the cutter head and at least partly to the rear of the cutter head, for gathering material cut by the cutter head and moving the cut material to the conveyor, the gathering head comprises a pair of counter-rotating discs with upstanding vanes, and an angled deck substantially coplanar with the disc; the second shaft having first and second transmission elements connected thereto, the first and second transmission elements operatively connected to the discs for effecting counter-rotation driving thereof; the angled deck during normal operation making an angle with respect to the dimension of elongation of the chassis, the chassis having a maximum height of about twenty inches, and the cutter head having a maximum diameter of about twenty two inches.

The system further comprises a plurality of wheeled conveyor carts connected to the continuous mining machine, each cart having a self contained driven conveyor belt associated therewith, and a maximum height of twenty inches or less. The wheeled conveyor carts preferably are as described above, and preferably some but not all of the conveyor carts are powered (having means mounted on a chassis thereof for driving the cart wheels). That is approximately one out of every three of the conveyor carts may include means mounted on the chassis for driving the cart wheels. Typically each cart has a maximum width of less than six feet (the wheels being the maximum width portion thereof, and is between about 10–14 feet long (e.g. about 12 feet, or four meters, long). The system may further comprise a safety, retrieval, cable securely connected to the mining machine, the cable supported by the conveyor carts and connected to a take-up drum.

It is the primary object of the present invention to provide an effective conveyor cart for a continuous mining machine system, and a continuous mining machine system per se, especially for mining ultra thin coal seams or the like. This and other objects of the invention will become clear from an inspection of the detailed description of the invention and from the appended claims.

BRIEF DESCRIPTION OF THE DRAWINGS

FIGS. 1A–1C are collectively a side schematic view of a pair of exemplary conveyor carts according to the present invention mounted to each other and with the leading cart mounted to the trailing portion of the continuous miner preferably pursuant to U.S. Pat. No. 5,871,260;

FIGS. 10A and 10B collectively are a top plan schematic view showing the utilization of carts according to the invention with the miner of U.S. Pat. No. 5,871,260 to mine coal or the like.

DETAILED DESCRIPTION OF THE DRAWINGS

Figure 2:
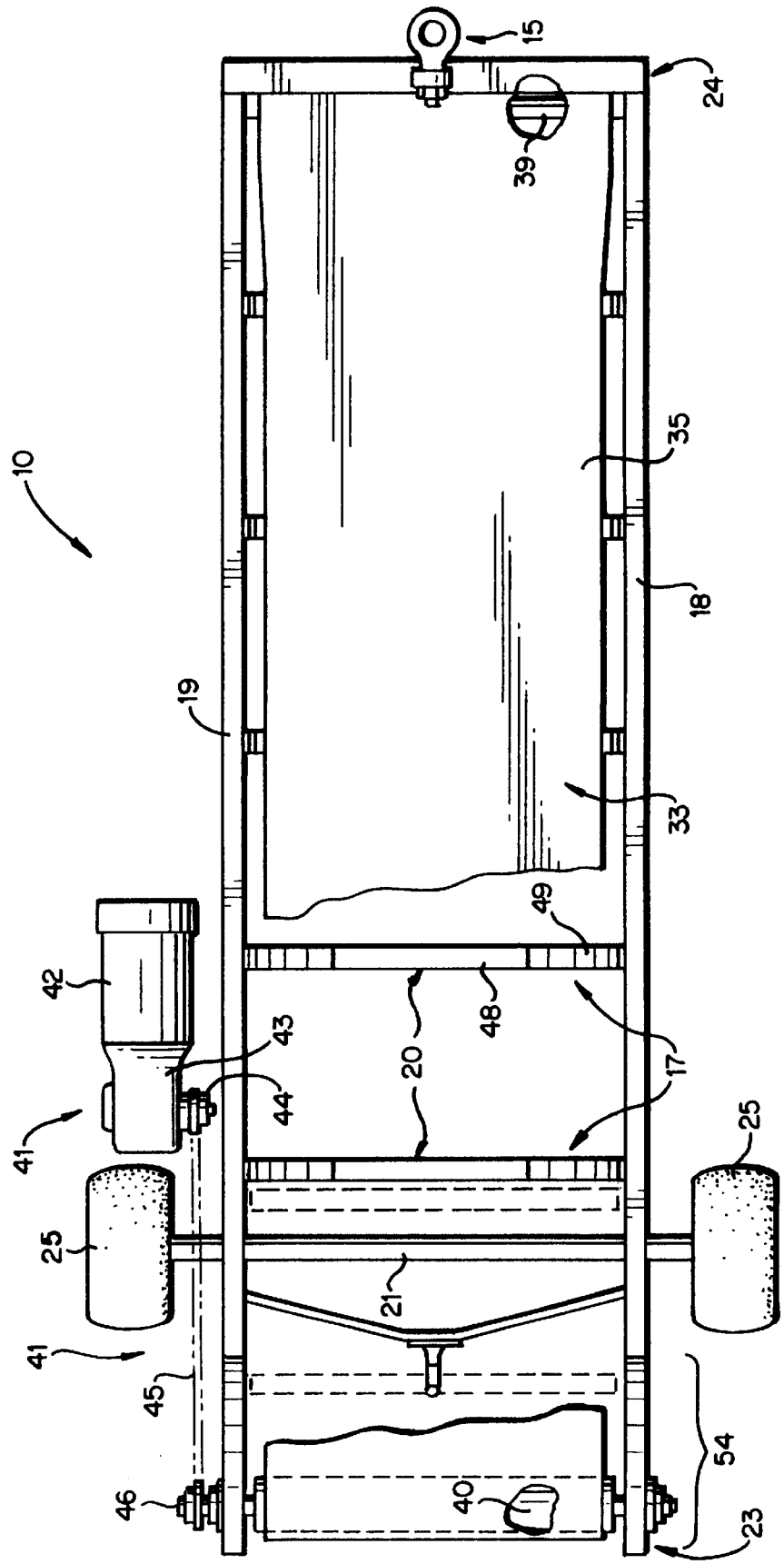
FIG. 2 is a top plan view of one of the carts of FIGS. 1A–1C, that particular cart not having a drive mechanism associated therewith.

An exemplary conveyor cart according to the present invention is shown generally by reference numeral 10 or 11 in the drawings. The only difference between the carts 10 and 11 is that the carts 10 are not self-propelled whereas the carts 11 are. FIGS. 1A–1C show two carts 10 connected to the rear (that is to the tail discharge 12) of the continuous miner 13. The continuous miner 13 preferably is the ultra thin coal seam miner disclosed in U.S. Pat. No. 5,871,260. In order to adapt the miner 13 for connection to the leading conveyor cart 10 a coupling mechanism 14 is associated therewith for cooperating with the first coupling mechanism 15 of the cart 10. While any suitable coupling mechanisms may be utilized, such as conventional ball joints, universal joints, and pintle hooks, preferably the coupling mechanism 15 comprises a conventional eye bolt such as model BDB12503 available from Buyers Products Company, while the coupling mechanism 14 comprises a pintle hook, such as a five ton pintle hook PH5 available from Buyers Products Company. Each cart 10 also preferably includes a pintle hook 16 at the opposite end thereof from the eye bolt 15 for connection to a trailing cart 10, 11. The couplings 14, 15 and 15, 16 provide pivotal connection of the miner 13 with respect to the leading cart 10, and the carts 10, 11 with respect to each other, about a substantially vertical axis, with a minimum resistance to the pivotal action and maximum simplicity.

Each of the carts 10, 11 comprises a chassis (shown generally by reference numeral 17) which preferably comprises first and second side rails 18, 19 and a plurality of cross pieces 20 extending between the side rails 18, 19 and substantially perpendicular to thereto. Also an axle 21 (for the cart 10) or 22 (for the cart 11) extends between the side rails 18, 19 substantially perpendicular thereto. The axle 21 is closer to the trailing end 23 of the cart 10, 11 than it is to the leading end 24 thereof, the leading end 24 also being referenced—with respect to the side rails 18, 19, as the first ends thereof, with the trailing end 23 being referenced, with respect to the side rails 18, 19, as the second end thereof. The axle 21, 22 mounts first and second wheels 25 on opposite ends thereof, the wheels 25 also preferably exteriorly of the side rails 18, 19. In a preferred embodiment according to the present invention the cart 10, 11 has a maximum width (that is the far exteriors of the wheels 25) that is less than six feet (e.g. about five feet, nine inches), and the wheels 25 have a height, with respect to the chassis 17, and the chassis is so dimensioned, so that the total maximum height 26 (see FIG. 1) of each of the carts 10, 11 is about twenty inches or less, preferably about eighteen inches. The carts constructed as illustrated in the drawings typically would have a relatively small weight, e.g. between 900–1000 lbs. (e.g. about 950 lbs.).

The components described so far are preferably off the shelf components which are easy to obtain and utilize. For example, the side rails 18, 19 are preferably conventional rectangular steel tubing (stainless steel), such as two inch by six inch cross-section tubing, and the cross pieces 20 are preferably also rectangular tubing, preferably stainless steel. Any suitable mounting mechanism may be provided for mounting the side rails 18, 19 to the axle 22, such as the conventional bushing shown only schematically at 27 in FIG. 4.

The axle 21 is preferably a conventional non-driven axle from a conventional golf cart, while the axle 22 is a conventional driven axle from a conventional golf cart. A particularly suitable golf cart for this purpose is the Club Car® golf cart made by Club Car Inc. of Augusta, Ga., an Ingersoll-Rand company. The wheels 25 also are preferably conventional golf cart inflatable tires and associated hubs, such as tires sold by Goodyear Rubber and Tire Company under the trade designation "Power Rib".

While the conveyor carts 10, 11 may have any suitable length, preferably the length from the leading end 24 to the rear end 23 thereof is between about ten-fourteen feet, e.g. about twelve feet [about four meters], which provides maximum maneuverability while still not requiring too many carts for a particular mining operation.

For the carts 11 (see FIGS. 3 and 4) means are provided for powering the axle 22. While such means may comprise a gasoline powered engine, a DC motor, a pneumatic motor, a hydraulic motor, or the like with suitable gearing, preferably such means comprise an AC motor 30 (such as a GE 3.1 horsepower motor) and a golf cart transmission 31, both mounted adjacent the axle 22. The transmission 31 is preferably the transmission used with the Club Car® golf cart described above. Such transmissions are readily available, inexpensive, small in size and weight, yet provide positive driving action for the axle 22, and will effectively power the cart 11, and typically at least one other cart 10, under normal mining conditions.

Even though a number of the carts 11 are driven, they do not adversely affect the operation of the miner 13 even if there is a differential in the drive speed between the miner 13 and the carts 11. Because the transmission 31 has a differential, and also because the miner 13 is so much more massive and powerful than any of the carts 11, if the carts 11 have the wheels 25 thereof rotated at a speed that translates into linear movement faster than that of the miner 13, they will merely slightly spin, without any adverse affect on any of the components. A typical penetrate rate is about four feet per minute which can be readily coordinated for the motors 30 and the motors associated with the miner 13.

The carts 10, 11 each also have a conventional endless conveyor belt 33 associated therewith, and means for mounting the conveyor belt 33 to the chassis 17 so that the conveyor belt 33 has a top portion 34 with a top surface 35 (see FIGS. 1 and 2) and a bottom surface 36 (see FIG. 1) and a bottom portion 37. While the mounting means may comprise any suitable conventional mounting structure such as wheels, rollers, bearings, or the like. Preferably the mounting means comprises a first roller 39 mounted adjacent the first end 24 and extending substantially perpendicular to the side rails 18, 19, and a second roller 40 mounted adjacent the second end 23 and also extending substantially perpendicularly to the side rails 18, 19.

Means are also provided for moving the conveyor belt 33 with respect to the chassis 17 so that the top portion 34 moves from the end 24 toward the end 23, and the bottom portion 37 moves oppositely. The moving means preferably comprises a device for driving one or both of the rollers 39, 40. In the preferred embodiment illustrated in the drawings such a drive means—shown generally by reference numeral 41 in FIGS. 2 and 3—comprises an AC electric motor 42 mounted by any suitable conventional bracket or other mechanism to the side rail 19, and having a gear box 43 which drives a sprocket 44 connected by a chain 45 to a sprocket 46 on the axle of the roller 40. The conveyor belt 35 is typically driven relatively slowly by the motor 42, e.g. between 200–300 feet per minute (preferably about 250 feet per minute). Any other suitable drive means may be provided such as belts and pulleys, linkages, intermeshing gears, or the like, and the motor 42 may be a hydraulic motor, gasoline powered, etc. instead of an electric motor. While any variety of electric motor may be utilized as the motor 42, preferably it, with a built in gear mechanism 43, comprises a five horsepower TEFC electric motor, such as available from Dodge with designation WG-28A. The motor 42 may be contained in a conventional explosion proof housing if considered necessary or desirable. For example the first few carts 10, 11 after the miner 13 may have explosion proof housings (both for the motor 42 and the motor 30 if desired).

Figure 4:
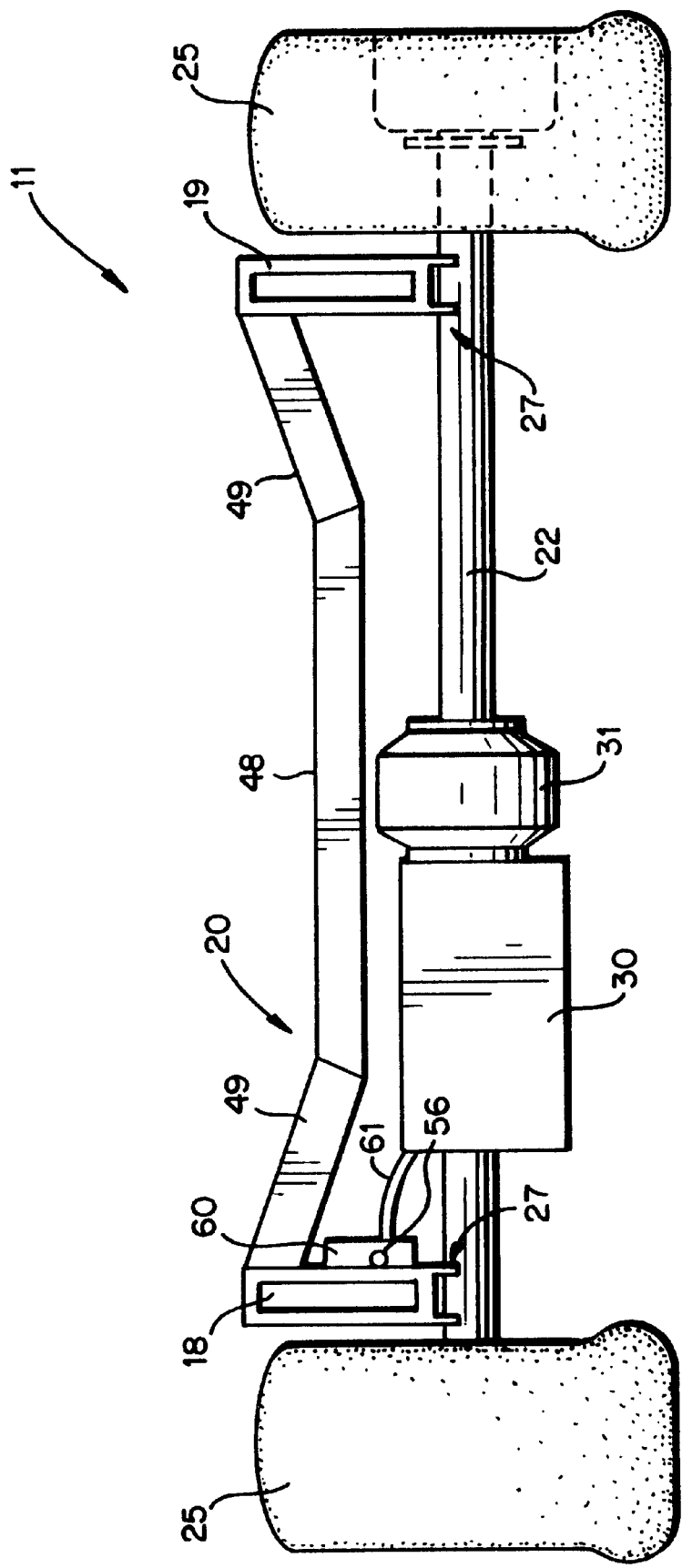
FIG. 4 is an front end view of the cart of FIG. 3 with some portions cut away for clarity of illustration, and showing the cross supports for mounting the conveying belt associated with the cart.

The means for mounting the conveyor belt 33 may also comprise the top surfaces 48, 49 of the cross pieces 20, as seen most clearly in FIG. 4. The conveyor belt 33 may directly engage the surfaces 48, 49 and if those surfaces are stainless steel there will be relatively low friction even when the conveyor belt 33 is loaded. However if necessary or desirable, a highly anti-friction coating (such as polytetrafluoroethylene) may be provided on the surfaces 48, 49, or rollers may be provided extending upwardly from at least some of the surfaces 48, 49.

Figure 3:
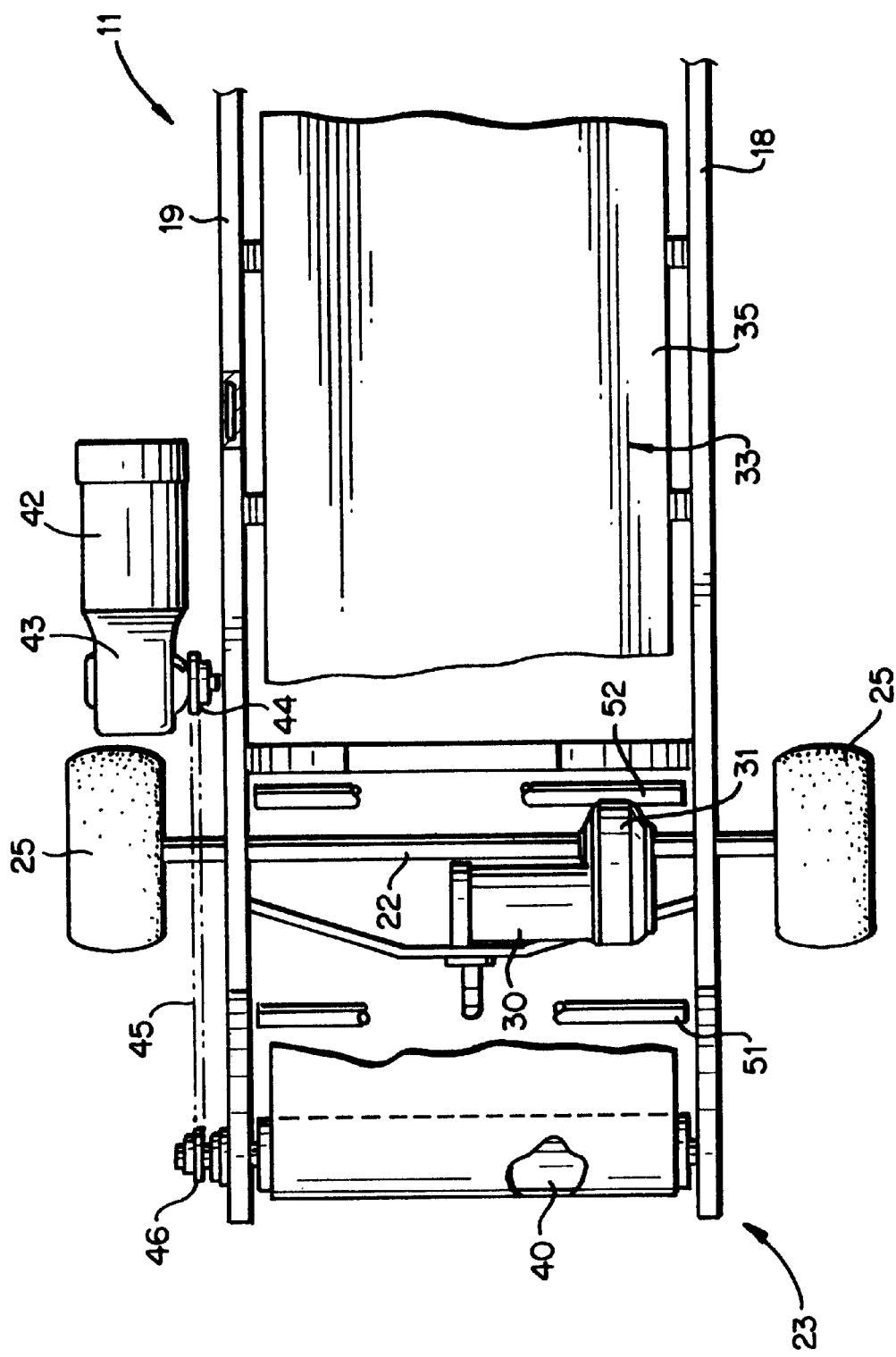
FIG. 3 is a partial view like that of FIG. 2 only showing a cart with a drive mechanism.

The means for mounting the belt 33 may also comprise other idler rollers, or "snub rolls", which are provided to redirect the bottom portion 37 of the belt 33 so that it moves over the coupling 16 and does not interfere with the motor 30 or transmission 31. Two exemplary such idler rollers 51, 52 are best seen in FIGS. 1A and 3.

As can be seen from the construction details illustrated in FIGS. 1A through 4, the carts 10, 11 according to the invention readily properly—in a self-contained manner—convey coal from the miner 13 to the mine mouth and since the end 23 of the leading conveyor cart 10 overlies the end 24 of the trailing conveyor cart 10, 11, the coal is readily transported from one cart 10, 11 to the next. In order to facilitate this transportation, and to minimize the distance that the coal must "fall" when being discharged from one end 23 of one cart 10, 11 to the end 24 of the next cart 10, 11, is best seen in FIG. 1B a tail section 54 of each cart 10, 11—which mounts the roller 40—extends downwardly at an angle from the side rail 18, 19 with which it is associated. The tail section 54 also preferably is of rectangular cross-section metal tubing and may be welded or otherwise affixed to the side rail 18, 19 with which it is associated.

Since the carts 10, 11 only have two wheels 25, and have a connection 15, 16 which allows ready pivotal action, the carts 10, 11 are very maneuverable within a mine, in addition to being easy to make and use.

Figure 5:
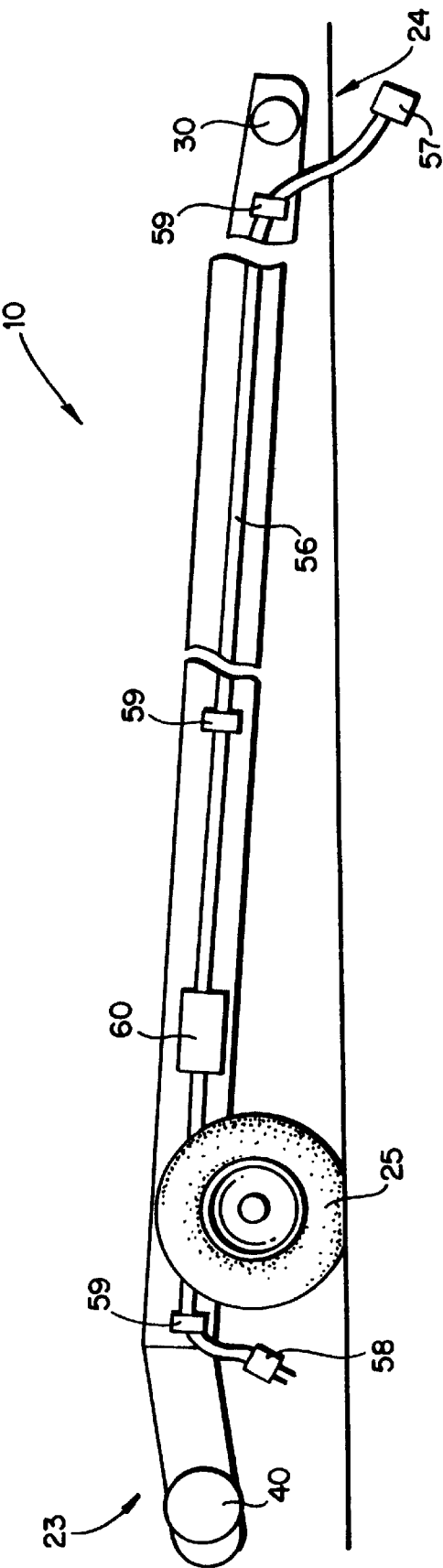
FIG. 5 is a schematic side view of the cart of FIG. 2 primarily illustrating only the electrical cable that is associated therewith to allow the motor or motors mounted thereon to be "plugged in"

FIG. 5 is a schematic side view of the cart 10 of FIGS. 1 through 4 only showing, schematically, an electrical cord 56 associated therewith for connecting both of the motors 30, 42 to a source of AC power at the mine mouth. As schematically illustrated in FIG. 5, the cord 56 has a conventional female plug 57 adjacent the front end 24 of the cart 10, and a conventional male plug 58 adjacent the trailing end 23. The cord 56 is mounted at various locations to either one of the rails 18, 19, or to a cross piece 20, by any suitable conventional bracket 59, and is also connected to a junction box 60 mounted near the motors 30, 42, and as also seen schematically in FIG. 4. From the junction box 60 wires (such as wire 61 in FIG. 4) go to the motors 30, 42 to provide power thereto. Of course the box 60 is mounted in a position where it will not interfere with the conveyor 35.

The cord 56 has sufficient slack therein, or is mounted at one portion thereof on a conventional reel or other let-off device, so that the male plug 58 of one cord 56 is plugged into the female plug 57 of the trailing cart 10, and at the mine mouth the male plug 58 for the last cart 10 is plugged into an extension cord which connects to a source of AC power, illustrated schematically at 63 in FIG. 10.

Figure 6:
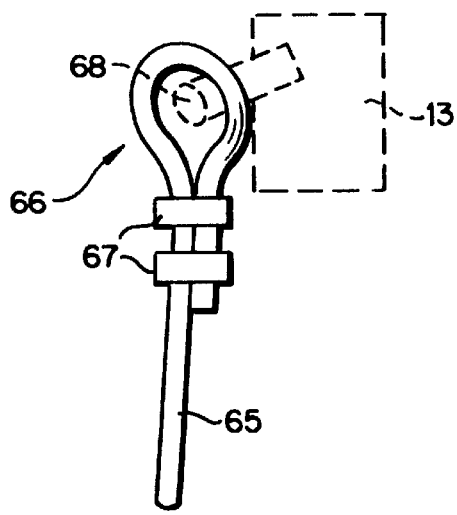
FIG. 6 is a schematic top plan detail view showing the end of a safety cable for attachment to a continuous miner and support by the carts of FIGS. 2 and 3.

According to the present invention it is also desirable to connect a safety, retrieval, cable 65 (see FIGS. 6 and 10A, 10B) to the miner 13. FIG. 6 shows a conventional end loop 66 of a steel cable, permanently held in place by clips or clamps 67, which receives any suitable post, clamp, pintle hook, or the like, shown schematically in dotted line at 68 in FIG. 6—on the miner 13. The opposite end of the cable 65 from the end 66 is connected to a conventional reeling mechanism 69 (FIG. 10B). Any conventional reel may be utilized for this purpose, such as those available under the trade name "Hannay Reels" from Clifford B. Hannay & Son, Inc. of Westerlo, N.Y.

Figure 7:
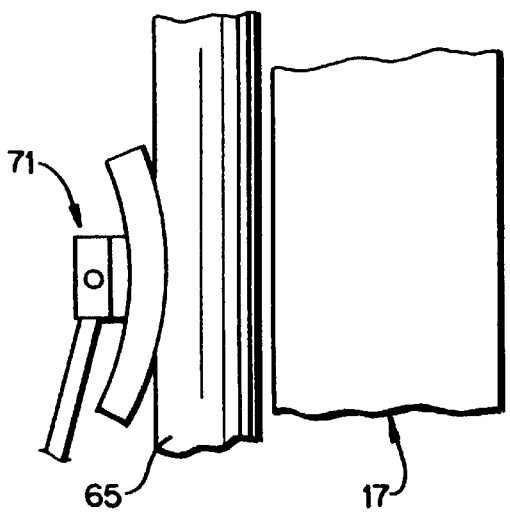
FIG. 7 is a top schematic view showing the safety cable of FIG. 6 clamped to a side rail of an exemplary conveyor cart according to FIGS. 2 and 3.

If necessary, the cable 65 may be clamped or otherwise attached to each or some of the carts 10, 11. FIG. 7 schematically illustrates the clamping of the safety/retrieval cable 65 to a portion of the chassis 17 of the cart 10, 11 utilizing a conventional clamp 71. The clamp 71 may be a quick release and engage conventional clamp, such as a "Haven" clamp or grip available from Klein Grips.

Figure 8:
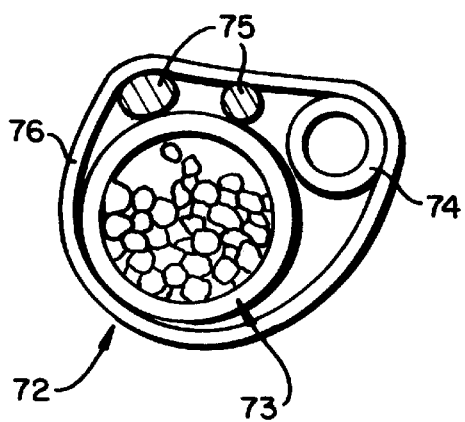
FIG. 8 is a front end view of an electrical cable and associated elements combination that is supported by the carts of FIGS. 2 and 3 and leads from the mine mouth to the continuous miner.
Figure 10A:
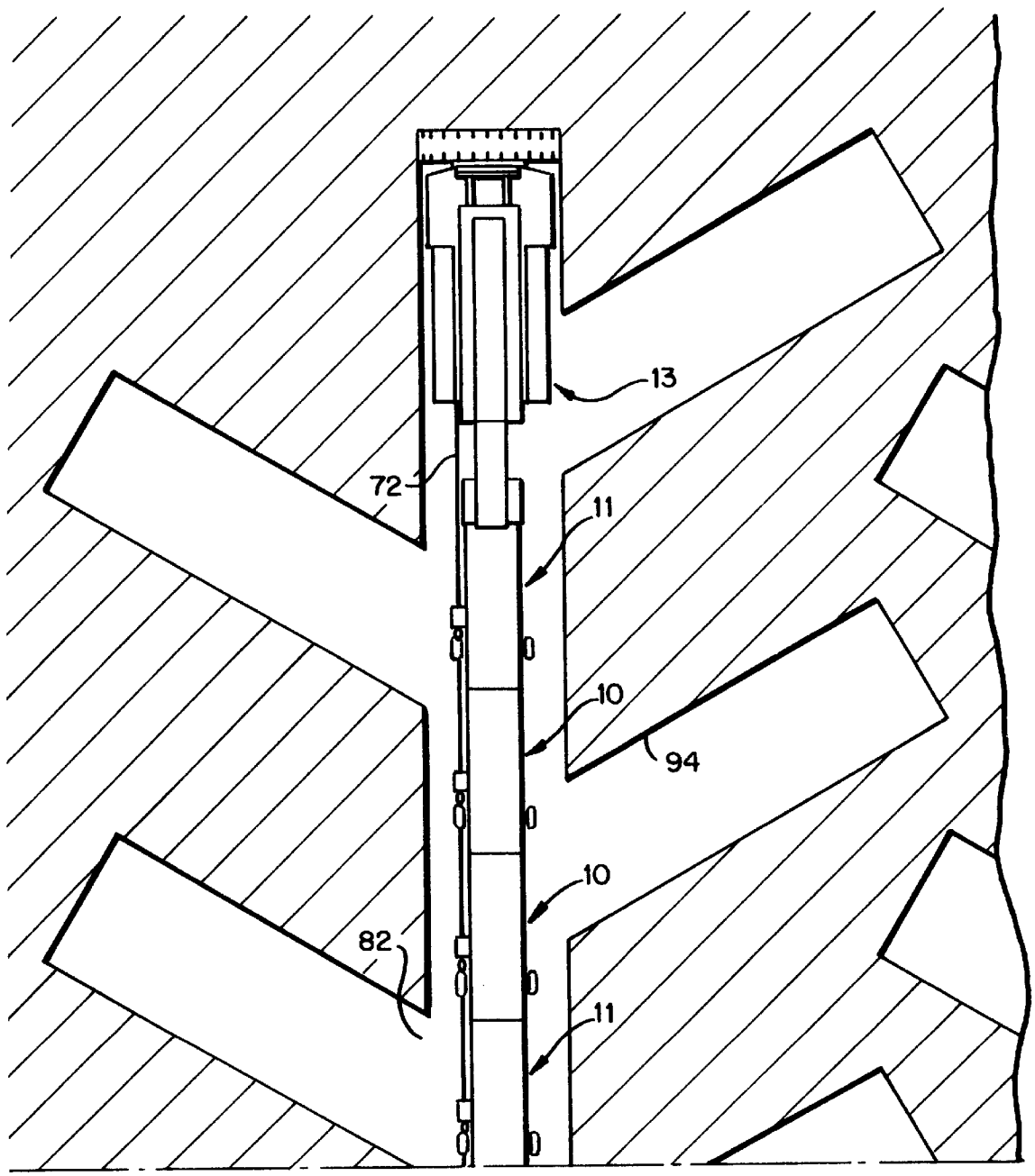
Figure 10B:
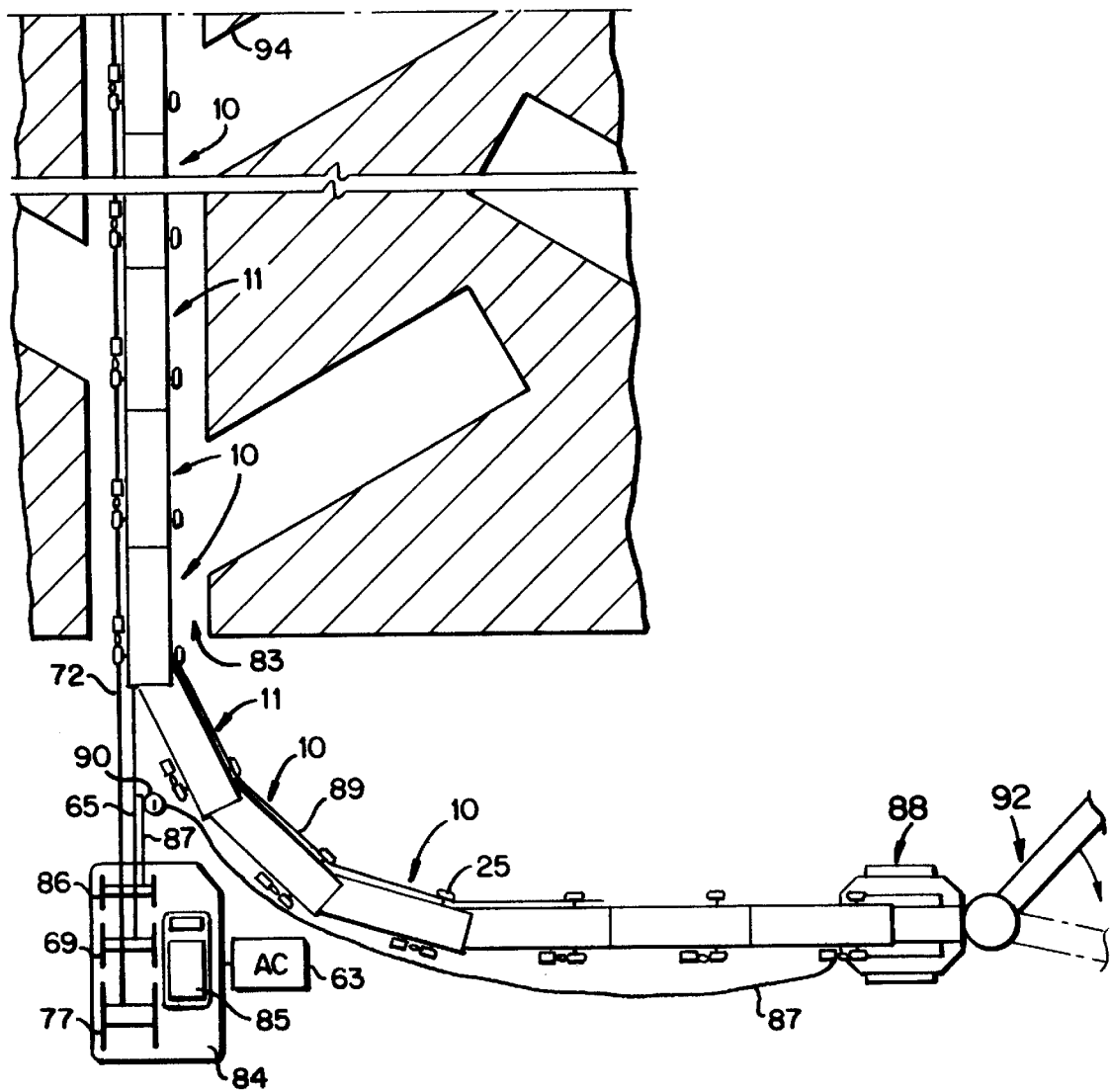

Since the miner 13 also needs a source of power, cooling water for the main drive motors thereof, and power for the cameras, and remote control structure, a trailing cable assembly 72—seen in FIGS. 8 and 10A, 10B—is provided. The cable assembly 72 includes a main electrical power cable 73, a tube 74 for cooling water, and small electrical cables 75 for the camera, remote control unit, and the like. The water transported by the tube 74 is merely sprayed on the mine face after it serves its cooling function, to reduce dust. Preferably a metal or plastic band 76 (see FIG. 8) or the like is placed around all of the components 73–75 at locations along the length thereof to hold all the components together. The entire cable assembly 72 is then connected to another conventional reel 77 (see FIG. 10B), such as a Hannay reel.

Figure 9:
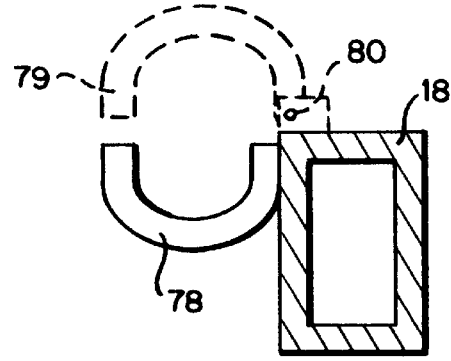
FIG. 9 is a detail schematic view showing an exemplary trough associated with one of the side rails of the conveyor carts of FIGS. 2 and 3 for mounting the cable assembly of FIG. 7.

In order to support the cable assembly 72 on the carts 10, 11, any suitable conventional device for holding a cable on to a moving structure may be provided. For example as illustrated in FIG. 9, a trough 78 with an open top is affixed to one of the side rails 18, 19 or a trough 78 may be connected to each of the side rails 18, 19. The cable assembly 72 may simple lay in the trough 78, or a clamp, cover, or latch—indicated in dotted line at 79 in FIG. 9—may be mounted about pivot pin 80 to cover the open top of the trough 78, and may be latched or otherwise held in place. This allows some relative longitudinal movement between the cable assembly 72 and the cart 10, 11 but supports the cable assembly 72 at appropriate locations along the length thereof.

FIGS. 10A and 10B illustrate a number of the carts 10, 11 connected to the miner 13 deployed in a mine bore 82 having a mine mouth 83. The reels 69, 77 are shown connected to a power and control platform 84 on which an operator's cab 85 is mounted. Associated with the platform 84 may be a diesel engine powered hydraulic tank and pump for powering the reels 77, 69. Also a third reel 86 may be provided which includes an electrical cord 87 which plugs into the male connector 58 of electrical cord 56, and is connected to the AC power source 63. A structure 84 is preferably mounted directly in line with the bore 82 just outside the mine mouth 83 since it is highly desirable to have the cables 65, 72 substantially straight. Since the carts 10, 11 are readily articulated with respect to each other, they can be placed in line at a conventional stacking conveyor 88 (such as available from Barber Green, e.g. a conventional Barber Green loader) that is driven by crawlers located to one side of the mine mouth 83, as seen in FIG. 10B. In order to properly guide the carts 10, 11 for their initial introduction into the mouth 83, a guide rail 89 may be affixed to the ground and engage the inside surfaces of the wheels 25 having the shortest turning arc to enter the mouth 83, as schematically illustrated in FIG. 10B.

Since it is necessary to connect each of the cords 56 to the cable 87 as soon as a cart 10, 11 is introduced into the line (since all of the carts 10, 11 have self-contained conveyors 35 which conveyor the coal to the conventional stacking conveyor 88) the cord 87 extends to the stacking conveyor 88 and may extend from reel 86—if used—around a pulley 90. There is a minor interruption in the conveyance of the coal each time a cart 10, 11 is added because the cord 87 is unplugged, the stacking conveyor 88 driven away from the then-existing trailing cart 10, 11, a new cart 10, 11 added and plugged in, and the stacking conveyor 88 driven into association with the new trailing cart 10, 11. The stacking conveyor 88 may include a discharge conveyor 92 associated therewith which is pivotal to a wide variety of locations and may discharge into trucks, train cars, or any other suitable mechanism for conveying coal to a desired location remote from the mine mouth 83.

In typical operation of the system illustrated in FIGS. 10A and 10B three operators are necessary, one for operating the stacking conveyor 88, one for plugging and unplugging each of the cars 10, 11 and moving new cars into place as they are added, and one in the cab 85.

The miner 13 operates as in the co-pending application, with each of the carts 10, 11 added as necessary as the miner 13 penetrates. Because of the articulation between the miner 13 and the first cart 10, 11 provided by the couplings 14, 15, the side bores 94 may readily be formed as described in U.S. Pat. No. 5,871,260.

Should there be a collapse of the roof of the bore 82, or one of the side bores 94, using the retrieval cable 65 it will be easier to retrieve the miner 13 and carts 10. As many carts 10, 11 are disconnected as possible, leading up to the cave in, and if it is possible to safely remove some coal or overburden, or shore up the roof of the bore, that will be done by human miners. Then by operating the reel 69, while at the same time driving the miner 13 in reverse (and cutting in reverse if necessary), it is likely that in most circumstances the miner 13 can be retrieved.

Utilizing the system illustrated in FIGS. 10A and 10B, it is possible to recover about 40–50% (e.g. about 44%) of the coal up to the depth that the miner 13 moves, which can easily be greater than the depth than an auger penetrates (e.g. greater than 150 feet).

It will thus be seen that according to the present invention a highly advantageous conveyor cart for a mining machine, and a continuous mining means system including a continuous mining machine and conveyor carts, have been provided which allow effective and relatively inexpensive mining of ultra thin coal seams and the like. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent structures, devices, and procedures.

What is claimed is:

1. A conveyor cart for a mining machine comprising:
   a chassis comprising first and second side rails, and a plurality of cross pieces extending between said side rails, each side rail having a first end and a second end;
   a first coupling mechanism mounted adjacent said first ends of said side rails for coupling said cart to a like cart;
   an axle extending generally perpendicular to said side rails and closer to said second ends of said side rails than said first ends;
   first and second wheels mounted to said axle on opposite ends thereof;
   an endless conveyor belt;
   means for mounting said conveyor belt to said chassis so that said conveyor belt has a top portion for conveying mined material thereon, and a bottom portion, and so said top portion moves from adjacent said first ends of said side rails toward said second ends of said side rails while said bottom portion moves oppositely;
   means for moving said conveyor belt with respect to said chassis so said top portion moves from said first ends of said side rails toward said second ends of said side rails while said bottom portion moves oppositely;
   a second coupling mechanism mounted adjacent said second ends of said rails and beneath said bottom portion of said conveyor and closer to said second ends of said rails than said wheels, for coupling said cart to a like cart, so that when two like carts are coupled together the top conveyor belt portion of the leading cart is above said top conveyor belt portion of the trailing cart, and
   means mounted on said chassis for powering said axle and thereby driving said wheels, comprising an electric motor and a golf cart transmission, both mounted adjacent said axle.

2. A conveyor cart as recited in claim 1 wherein said means for mounting said conveyor belt comprises a first roller adjacent said first end of said side rails and extending substantially perpendicular thereto; a second roller adjacent said second end of said side rails and extending substantially perpendicular thereto; and top surfaces of said cross pieces disposed between said top and bottom portions of said conveyor belt and engaging a bottom surface of said top portion of said conveyor belt.

3. A conveyor cart as recited in claim 2 further comprising a tail section of said chassis which mounts said second roller, said tail section extending downwardly from a position closest to said axle to a position furthest from said axle, and positioned on the opposite side of said axle from said first end of said side rails.

4. A conveyor cart as recited in claim 1 wherein said cart has a maximum height of twenty inches or less.

5. A conveyor cart as recited in claim 1 wherein said wheels are inflatable golf cart tires, and said axle comprises a golf cart axle.

6. A conveyor cart as recited in claim 1 wherein said means for mounting said conveyor belt further comprises first, second and third rollers, said first roller adjacent said first end, and said second roller adjacent said second end, and said third roller between said first and second rollers, said first, second and third rollers causing said bottom portion of said belt to pass over said axle, motor, and transmission in moving the belt from said second end to said first end.

7. A conveyor cart as recited in claim 1 further comprising an electrical wire mounted to said chassis and electrically connected to said motor, and having a female plug and a male plug, said female plug adjacent said first ends of said side rails, and said male plug adjacent said second ends of said side rails.

8. A conveyor cart as recited in claim 1 wherein said axle and said wheels comprise the only axle and wheels of said cart.

9. A conveyor cart as recited in claim 1 further comprising an electrical cable supporting trough mounted to at least one of said side rails for mounting an electrical cable therein.

10. A conveyor cart as recited in claim 9 further comprising a clamp mounted to said chassis for clamping a safety cable to said chassis.

11. A conveyor cart as recited in claim 1 wherein said first and second coupling mechanisms comprise an eye bolt and a pintle hook, which allow pivotal movement, about a substantially vertical axis, of a trailing cart with respect to a leading cart when coupled together.

12. A conveyor cart for a mining machine comprising:
   a chassis comprising first and second side rails, and a plurality of cross pieces extending between said side rails, each side rail having a first end and a second end;
   an axle extending generally perpendicular to said side rails and closer to said second ends of said side rails than said first ends;
   first and second wheels mounted to said axle on opposite ends thereof;
   an endless conveyor belt;
   means for mounting said conveyor belt to said chassis so that said conveyor belt has a top portion for conveying mined material thereon, and a bottom portion, and so said top portion moves from adjacent said first ends of said side rails toward said second ends of said side rails while said bottom portion moves oppositely;
   means for moving said conveyor belt with respect to said chassis so said top portion moves from said first ends of said side rails toward said second ends of said side rails while said bottom portion moves oppositely; and
   wherein said cart has a maximum height of twenty inches or less.

13. A conveyor cart as recited in claim 12 further comprising means mounted on said chassis for powering said axle and thereby driving said wheels.

14. A conveyor cart as recited in claim 13 wherein said means for powering said axle comprises an motor and a golf cart transmission, both mounted adjacent said axle, and wherein said wheels are inflatable golf cart tires.

15. A conveyor cart as recited in claim 12 having a maximum height of about 18 inches.

16. A conveyor cart as recited in claim 12 further comprising a tail section of said chassis which extends downwardly from a position closest to said axle to a position furthest from said axle, and positioned on the opposite side of said axle from said first end of said side rails.

17. A continuous mining machine system comprising:

a continuous mining machine comprising: a chassis supported by crawler tracks, and having a front and a rear and elongated in a first dimension between said front and said rear; a substantially horizontal axis powered cutter head mounted to said front of said chassis; a conveyor mounted to said chassis and including an endless conveyor chain; said chain connected to first and second sprockets, said first sprocket mounted for rotation about a first shaft adjacent said rear of said chassis, and said second sprocket mounted for rotation about a second shaft adjacent said front of said chassis but between said first sprocket and said cutter head; said first and second shafts rotatable about axes generally perpendicular to said first dimension; at least one motor for driving one of said first and second shafts to thereby drive one of said sprockets and said conveyor; a gathering head mounted adjacent said front of said chassis and below said cutter head and at least partly to the rear of said cutter head, for gathering material cut by said cutter head and moving the cut material to said conveyor, said gathering head comprises a pair of counter-rotating discs with upstanding vanes, and an angled deck substantially coplanar with said disc; said second shaft having first and second transmission elements connected thereto, said first and second transmission elements operatively connected to said discs for effecting counter-rotation driving thereof; said angled deck during normal operation making an angle with respect to said dimension of elongation of said chassis, said chassis having a maximum height of about twenty inches, and said cutter head having a maximum diameter of about twenty two inches; and a plurality of wheeled conveyor carts connected to said continuous mining machine, each cart having a self contained driven conveyor belt associated therewith, and a maximum height of twenty inches or less.

18. A continuous mining machine system as recited in claim 17 further comprising a safety, retrieval, cable securely connected to said mining machine, said cable supported by said conveyor carts and connected to a take-up drum.

19. A continuous mining machine system as recited in claim 17 wherein said wheeled conveyor carts each have first and second wheels; and wherein some, but not all, of said conveyor carts comprise means mounted on a chassis of said cart for driving said cart wheels.

20. A continuous mining machine system as recited in claim 19 wherein each said cart has only two wheels, said wheels closer to an end of said cart most remote from said continuous mining machine than to an end of said cart closest to said continuous mining machine.

21. A continuous mining machine system as recited in claim 19 further comprising an electrical wire mounted to each of said carts and electrically connected to a motor mounted on said cart, and having a female plug and a male plug, said female plug adjacent the leading end of said cart, closest to said mining machine, and said male plug adjacent the trailing end of said cart.

22. A continuous mining machine system as recited in claim 19 wherein each cart has a maximum width of less than six feet, and is between about ten-fourteen feet long.

23. A continuous mining machine system as recited in claim 17 further comprising an electrical cable connected adjacent a first end thereof to said continuous mining machine, and adjacent a second end thereof to a reel and a source of electrical power; and wherein said electrical cable is supported by said carts.

24. A continuous mining machine system as recited in claim 17 wherein said wheeled conveyor carts each have first and second cart wheels; and wherein approximately one out of every three of said conveyor carts includes means mounted on a chassis of said cart for driving said cart wheels.

* * * * *